United States Patent [19]

Mesenich

[11] Patent Number: 4,749,892

[45] Date of Patent: Jun. 7, 1988

[54] SPRING ARRANGEMENT WITH ADDITIONAL MASS FOR IMPROVEMENT OF THE DYNAMIC BEHAVIOR OF ELECTROMAGNETIC SYSTEMS

[75] Inventor: Gerhard Mesenich, Bochum, Fed. Rep. of Germany

[73] Assignee: Colt Industries Inc., New York, N.Y.

[21] Appl. No.: 63,440

[22] Filed: Jun. 18, 1987

Related U.S. Application Data

[63] Continuation of Ser. No. 602,605, Apr. 20, 1984, abandoned.

[30] Foreign Application Priority Data

Apr. 25, 1983 [DE] Fed. Rep. of Germany ....... 3314899

[51] Int. Cl.⁴ ............................................. H02K 41/00

[52] U.S. Cl. ......................................... 310/19; 310/30

[58] Field of Search ........................ 310/17, 19, 20, 30, 310/34

[56] References Cited

U.S. PATENT DOCUMENTS

| | | | |
|---|---|---|---|
| 519,870 | 5/1894 | McKay | 310/19 |
| 1,019,213 | 3/1912 | Adams | 310/19 X |
| 2,248,110 | 7/1941 | Murphy | 310/30 |
| 2,285,361 | 6/1942 | Roters et al. | 310/30 |
| 2,436,992 | 3/1948 | Ernst | 310/30 |
| 3,538,954 | 11/1970 | Fagerlie et al. | 137/625.65 |
| 3,707,992 | 1/1973 | Ellison et al. | 137/625.65 |
| 4,311,280 | 1/1982 | Knape | 239/585 |
| 4,342,443 | 8/1982 | Wakeman | 251/137 |

FOREIGN PATENT DOCUMENTS

| | | |
|---|---|---|
| 1179068 | 11/1964 | Fed. Rep. of Germany . |
| 1589782 | 3/1970 | Fed. Rep. of Germany . |
| 101783 | 3/1973 | Fed. Rep. of Germany . |
| 2153224 | 5/1973 | Fed. Rep. of Germany . |
| 2710458 | 9/1977 | Fed. Rep. of Germany . |
| 2639274 | 3/1978 | Fed. Rep. of Germany . |
| WO83/00770 | 3/1983 | PCT Int'l Appl. . |
| 1540324 | 2/1979 | United Kingdom . |
| 1553637 | 10/1979 | United Kingdom . |
| 2080627A | 2/1982 | United Kingdom . |

OTHER PUBLICATIONS

IBM Technical Disclosure Bulletin, vol. 6, No. 12, May 1964, p. 61, "Suppressing Bouncing Caused by Impacts", by E. Balle et al.

*Primary Examiner*—Mark O. Budd
*Attorney, Agent, or Firm*—Walter Potoroka, Sr.

[57] ABSTRACT

A supplementary mass is arranged in an electromagnet system between armature and reset spring in such a way that, after reaching an end position, the armature is relieved of the spring force; due to the relief, a high excess of magnetic force is available for braking the subsequent bounce movement; the mass and force conditions of the magnet system are matched so that the subsequent collision of armature and supplementary mass occurs counter-directionally and the remaining kinetic energy of the armature is used up to a large extent by the counter-directional collision; the small bounce movement permits the use of spring systems with very high reset forces when the armature is pulled-in whereby the movement times of the armature are greatly shortened; and specific springs and spring arrangements for producing suitable reset spring force characteristics are described.

19 Claims, 8 Drawing Sheets

SPRING ARRANGEMENT WITH ADDITIONAL MASS FOR IMPROVEMENT OF THE DYNAMIC BEHAVIOR OF ELECTROMAGNETIC SYSTEMS

This is a continuation of application Ser. No. 602,605, filed Apr. 20, 1984.

FIELD OF THE INVENTION

This invention relates generally to electromagnetic motor means or systems and more particularly to such motor means or systems employed as actuating means as in high speed fuel injection valve assemblies, electromagnetic printers, rapid hydraulic valves and the like.

BACKGROUND OF THE INVENTION

Common to all prior art electromagnetic motor means or systems is an electromagnetic circuit consisting of an exciting coil, armature and magnetic flux return. After the exciting current has been applied to the coil, the armature is moved into an end position counter to the force of one or more springs. To obtain a sufficiently short pull-in or pull-up process, the spring force must be only a fraction of the pull-in or pull-up force of the magnet system. Yet, toward the end of the pull-in process the excess force of the magnet is generally not sufficient to prevent rebounce of the armature. The bounce is stronger as the excess of the magnetic force over the spring force is smaller.

During the bounce process it is not possible to disconnect the coil current without thereby impairing the reproducibility of the actuation process. If the coil current is disconnected before termination of the bounce process different movement conditions of the armature result, depending on whether at the time of disconnection the armature is moving counter to or in the reset direction.

As the coil current is being terminated, the reset movement is delayed by eddy currents in the magnetic circuit and by damping (attenuation) of the coil. The armature movement begins as soon as the spring force exceeds the induction force caused by eddy currents and damping and the remanent magnetic force.

To obtain a short reset delay, it is customary, in the prior art, to provide a residual air gap, which, however, increases the holding current requirement and hence the energy consumption of the electromagnet. Short reset delay times are achieved only with high spring forces, which, however, reduce the excess of the magnetic force and hence increase the chatter or bounce.

Accordingly, the invention as herein disclosed and described is primarily directed to the solution of the aforestated problems and other related and attendant problems of the prior art.

SUMMARY OF THE INVENTION

According to one aspect of the invention, a spring arrangement with supplementary mass for improving the dynamic behavior of an electromagnetic system, comprises one or more supplementary masses disposed between the armature means and reset spring means, at least one supplementary mass not forming a part of the mechanism to be actuated serves for the suspension of the reset spring means, the mass of the supplementary mass is substantially less than that of the armature means and can continue to move counter to the force of one or more of said reset spring means even after an end position of the armature has been reached so that after reaching such an end position of the armature means the armature means is relieved of reset spring means force by the supplementary mass continuing to move during a period of time which is considerable as compared with the bounce time of the armature means so that a high excess of force is available for braking the rebound movement of the armature means and thereby greatly shortening the bounce time of the armature means.

According to another aspect of the invention, a spring arrangement with supplementary mass for improving the dynamic behavior of an electromagnetic system, comprises at least one supplementary mass inserted between the armature means and one or more reset spring means, the mass of the supplementary mass is substantially less than that of the armature means and can continue to move counter to the force of one or more of said reset spring means even after an end position of the armature means has been reached, wherein said supplementary mass may be formed also by the mechanism to be actuated, wherein after an end position has been reached by the armature means the armature means is relieved of the force of at least one of said reset spring means by the supplementary mass continuing to move, and wherein the force and mass ratios of the system are adapted so that the movement energy remaining after impingement of the armature means is dissipated to a large extent in a second counter-directional collision of said armature means and said supplementary mass.

It is an object of the invention to accelerate the armature pull-in process by an adapted spring characteristic, to at least to a great extent eliminate armature chatter or bounce, and to shorten the time of the reset process by high reset forces. Consequently, by the then existing possibility of a reduced residual air gap, the energy requirement of the magnet and the required erasing power of the drive electronics is reduced and the pull-in process accelerated.

Other various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details and/or elements may be omitted from one or more views.

DETAILED DESCRIPTION OF THE PREFERRED EMBODIMENTS

Figure 1:
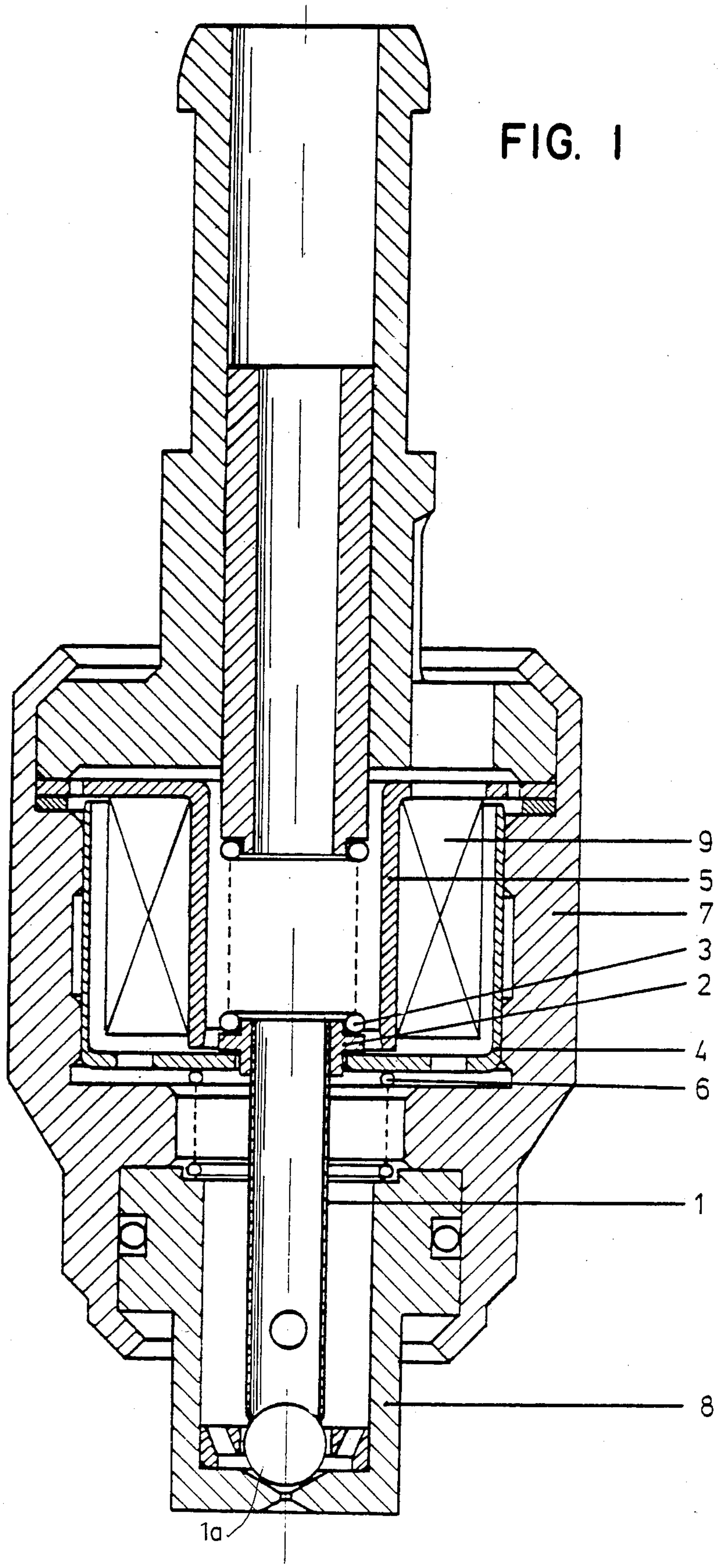
FIG. 1 is an axial cross-sectional view of an electromagnetic system, employing teachings of the invention, as may be employed, for example, in a fuel injection valve assembly for an internal combustion engine.

Referring in greater detail to the drawings, FIG. 1 illustrates an electromagnetic valve assembly, employing teachings of the invention, employed as for fuel injection for an internal combustion engine. In contrast to the usual prior art designs, the valve needle 1 is here not firmly connected with the armature 4, so that a two-mass system is formed. The armature 4 is mounted in the valve housing 7. At the lower end the valve needle is guided axially movable with little play by the nozzle body 8 and at the upper end by the armature 4. The pull-in force of the armature 4 is transmitted via the engaging piece 2 firmly connected with the valve needle 1. The valve is closed by the reset spring 3. After completion of a cycle, a second spring 6, whose force is much less than that of the reset spring 3, brings the armature 4 to abutment on the engaging piece 2 firmly connected with the valve needle.

When the energizing current is applied to the coil means 9, the magnetic force increases. After the net holding force of the spring 3 has been exceeded, armature 4 and the valve needle connected with the reset spring 3 are jointly accelerated by the magnetic force. After the armature 4 strikes against the bottom of magnet pole 5, the valve needle 1 continues to move due to inertia, so that the connection between the lower end (as viewed in FIG. 1) of the armature 4 and valve needle 1 is broken. Thereby the armature is relieved of the spring force of spring 3 during rebounce, so that, because of the now much greater effective magnetic force, the bounce of the armature is greatly shortened. The movement of the valve needle 1 is decelerated by the reset spring 3 and is subsequently reversed. By appropriate selection of mass and force ratios the movement of the armature 4 and valve needle 1 is matched so that at the instant of collision the armature 4 and valve needle 1 are moving in opposite directions and the remaining kinetic energy is dissipated to a large extent by such collision.

When the energizing current to the coil means 9 is terminated, the armature 4 and valve needle 1 are jointly reset by the spring 3. After the valve portion 1*a* closes, the downward inertia of armature 4 causes armature 4 to detach from the valve needle 1 and supplemental mass 2 and is braked by hydraulic damping. Since now the full force of spring 3 acts only on the needle valve 1, the subsequent bounce of the needle valve 1 is effectively brought to standstill by the high excess of such force spring 3 a very short time.

Figure 2:
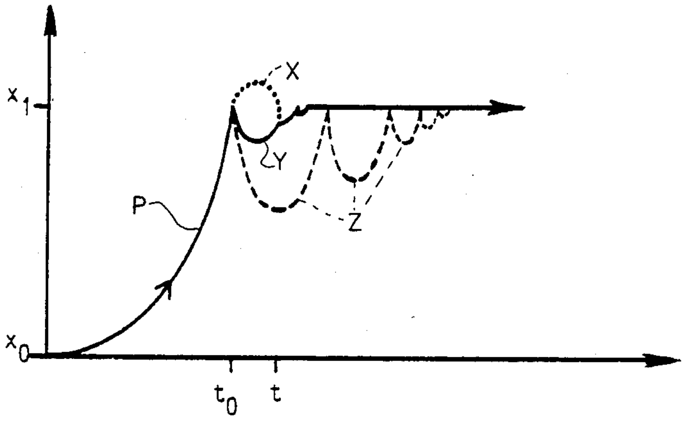
FIG. 2 is a graph illustrating, typically, the pull-in movement of the armature and needle valve of FIG. 1 compared to the application of an energizing current to the coil means with such current being plotted along the vertical axis and with the movement of the armature and needle valve being plotted generally along the horizontal axis.

For better comprehension, the movement conditions are illustrated in FIG. 2 on the simplifying assumption of constant spring force and magnetic force. The joint movement of armature 4 and needle valve begins after connection of the coil energizing current at point $x_0$. After having traveled the pull-in path P, the armature strikes against the central pole at time $t_0$ and bounces back, whereupon the needle valve 1 detaches and continues its path. The path of the needle valve is indicated by a short dotted line X, while the path of the armature is shown in solid line Y. The direction of movement of the armature is reversed by the magnetic force, that of the needle valve by the resetting or restoring spring 3 force, so that a time, t, the needle valve and armature collide moving in opposite directions. In so doing the kinetic energy of the two bodies is dissipated to a large extent. Thereafter the armature 4 and needle valve 1 move to the end position at a much reduced speed under the influence of the magnetic force. For comparison the movement which would result if the armature and needle valve were firmly connected, as in conventional systems, is also shown in dash line Z.

As should be apparent, in the conventional prior art systems much stronger chatter results in an undesired decrease in the reproducibility of injectable fuel quantity.

Figure 3:
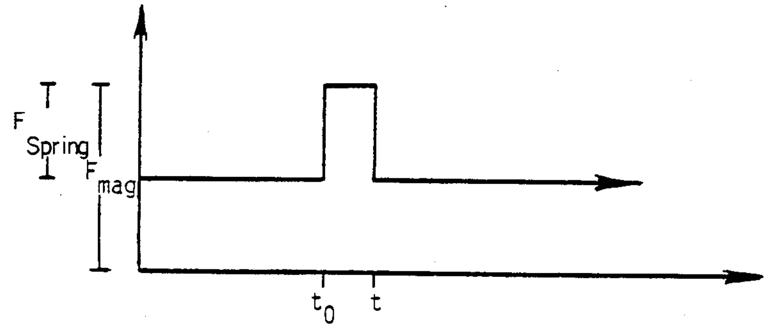
FIG. 3 is a graph illustrating the spring force and magnetic force acting on the armature of FIG. 1 with the time span correlated to that of FIG. 2; the spring force and magnetic force are plotted along the vertical axis while the time is plotted generally along the horizontal axis.

FIG. 3 shows the spring force and magnetic force acting on the armature 4. At the beginning of the movement, the armature 4 is accelerated by the excess of magnetic 3 force over the spring forces. At time, $t_0$, the armature 4 is relieved of the resetting spring force, so that the total magnetic force is available for braking the armature chatter. After the armature 4 and needle valve 1 have collided in opposite directions at time, t, the armature 4 is pulled into the fully opened end position at a greatly reduced speed.

In the injection valve of the invention as shown in FIG. 1, the total supplementary mass was formed by member 2, needle valve 1 assembly comprised of the tubular needle portion and ball valving member or portion 1*a*. This resulted in the advantage that after the closing of the valve the chatter process could be shortened by a high excess of force of the reset spring. However, in injection valves for injection of fuel into the induction passage of internal combustion engines the accuracy of fuel metering is influenced only slightly by the chatter process after the closing of the valve because the chatter process, after the closing of the valve, always occurs in the same reproducible manner. The known prior art injection valve models, in which the armature is directly connected with the valve member or in which the armature itself forms the valve member can therefore be improved in a particularly simple manner by disposing the supplementary mass between armature and reset spring.

Figure 4:
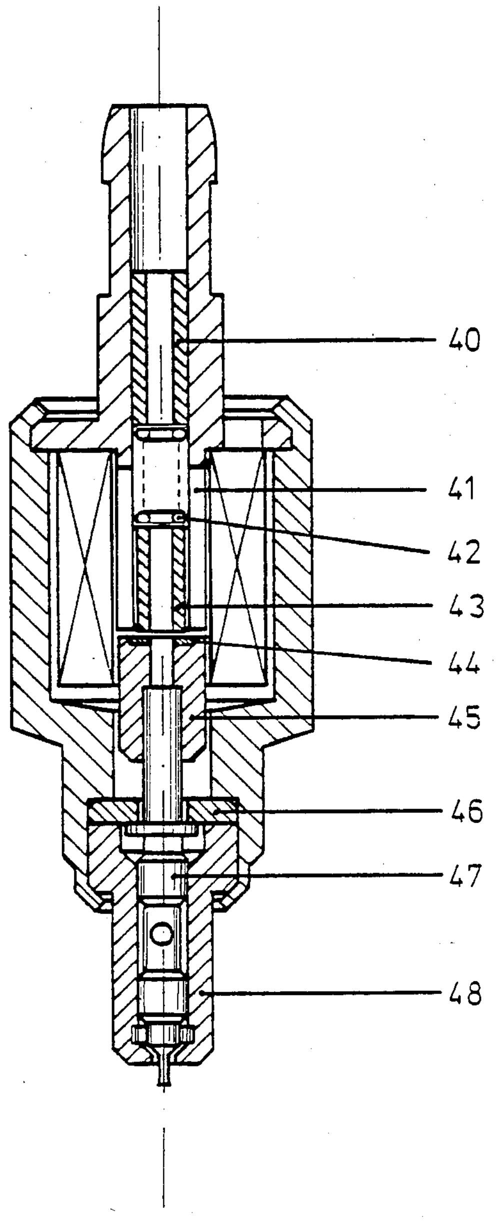
FIG. 4 is an axial cross-sectional view of an electromagnetic fuel injection valving assembly generally of prior art configuration but modified as to employ teachings of the invention.

FIG. 4 shows such an arrangement of the supplementary mass of the invention embodied as within an otherwise known prior art injection valve assembly. The armature 45 is firmly connected with the needle valve 47. The needle valve is guided with little radial play by the nozzle body 48 and the stroke of the needle valve is limited by the stop plate 46. The armature is reset by the reset spring 42. The movable tubular supplementary mass 43 of non-magnetizable material is located between the reset spring 42 and armature 45. After the needle valve strikes against the stop plate 46 the supplementary mass 43 continues its path and thereby relieves the armature 45 of the force of the reset spring 42. The movement conditions are matched to one another in the manner already described as in FIG. 1. In addition, a plate 44 of damping plastic is embedded in the armature 45. By the provision of plate 44 an additional dissipation upon collision of armature and supplementary mass in opposite directions is achieved. Further, as the needle valve closes, there is created by the plate 44 a force peak which shortens the subsequent chatter process. However, the effect of the plate 44 on the movement conditions is generally not very great, so that in the interest of easy manufacture the plate 44 may be dispensed with.

Figure 5:
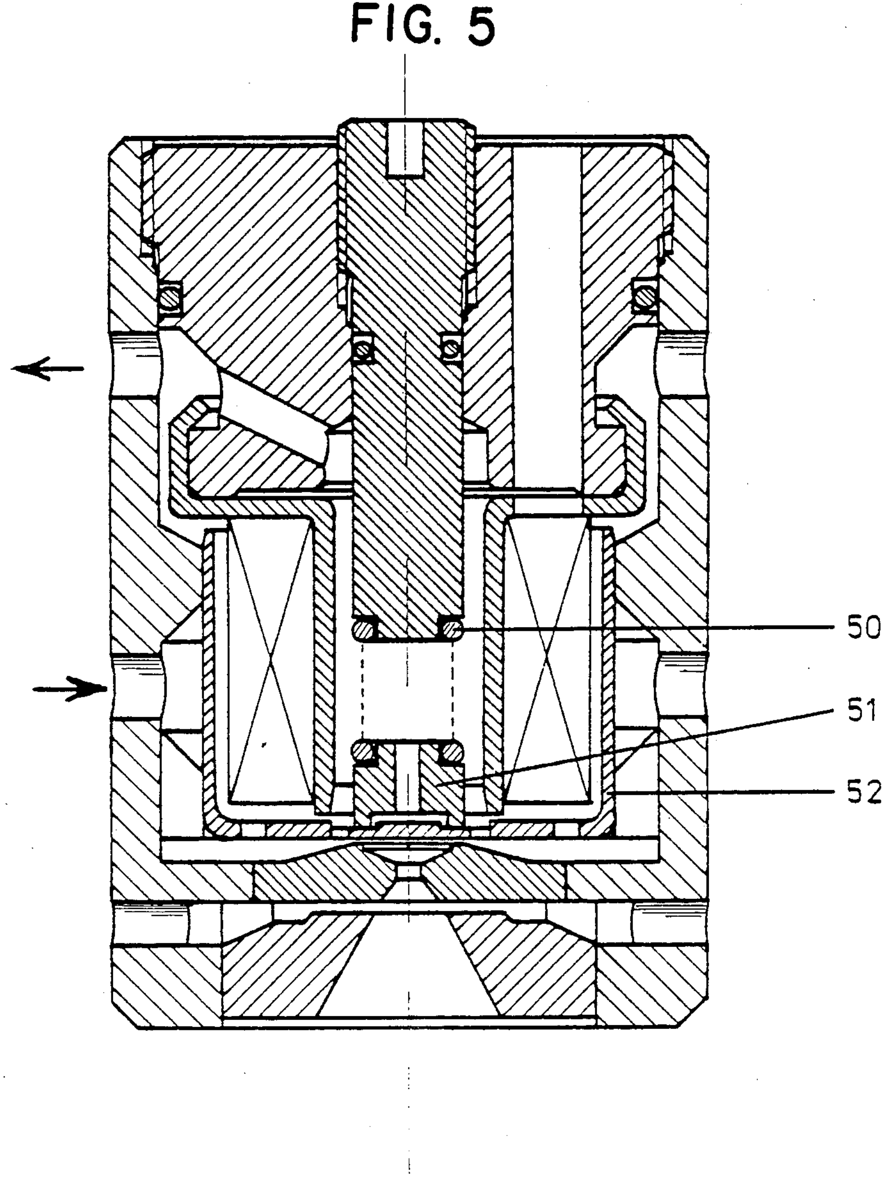
FIG. 5 is an axial cross-sectional view of another embodiment of an electromagnetic injection valving assembly employing teachings of the invention.

FIG. 5 shows, as a further example of the invention, a fuel injection valve where the armature itself serves as the valve member. Here, the supplementary mass 51 is disposed between the lower end of armature 52 and reset spring 50. A similar arrangement can be adopted also for injection valves which have, as armature and valve member, a ball of magnetizable material and a reset spring. To this end an annular supplementary mass is disposed between the ball and the reset spring. If appropriately shaped, the annular supplementary mass may alternatively consist of magnetizable material, to reduce the leakage losses and to increase the working air gap induction.

By matching of the mass and force ratios as thus far disclosed and described, the chatter is drastically shortened and thereby the reproducibly injectable fuel quantity is substantially enhanced. A definite improvement of the chatter can, however, be also achieved, without matching of the movement conditions, if during a period which is long in comparison to the chatter time at the open position the armature is relieved of the reset spring force by the continued movement of the supplementary mass away from the armature so that a high excess of magnetic force is available for braking the rebounce movement of the armature.

With the spring arrangement and supplementary mass, as thus far disclosed, the speed of the pull-in and reset time is not yet influenced. A substantial shortening of both the pull-in and the reset movement with simultaneous reduction of the chatter is (or can be) achieved by the combination of a multi-mass system with a specific reset spring arrangement.

To better explain the mechanism of action, consider, generally, first the motion as being a function of the force. That is, the kinetic energy and hence the impingement speed of a body moving without friction depends exclusively on the work supplied. The work supplied is the integral of the force gradient versus path. At equal supplied work the type of force gradient is of no importance for the kinetic energy. However, for the velocity gradient of the movement it is by no means immaterial in what form of force gradient the drive work is supplied. Much acceleration work at the beginning of the movement leads to a high velocity level which is maintained during the entire movement and hence leads to short movement times. At high application of work toward the end of the movement, on the contrary, increases only the impact velocity and hence the chatter without substantially shortening the movement time. With a movement where the total acceleration work is released at the beginning, the movement time is cut in half as compared with a movement at a constant force gradient.

In magnet systems, the movement time of the armature can be substantially shortened by an adapted, matched, spring characteristic. To this end, with a large magnet air gap a low spring load force must act so that as the armature pulls-in at the beginning of the movement a high excess of magnetic force is available for the acceleration of the armature. After a part of the pull-in path has been traveled the reset spring force must increase abruptly so as to obtain short movement times in the following reset movement. Through the abruptly increasing spring force, toward the end of the pull-in movement, the kinetic energy of the armature is reduced in the desired manner without notably prolonging the movement time. However, because of the small excess of magnetic force toward the end of the pull-in movement, the high reset spring force would, without additional measures, lead to extremely strong chatter movements thereby making the foregoing method unusable.

According to the invention, the chatter movements are suppressed in that the abruptly rising spring characteristic is produced by a supplementary spring which is connected with a supplementary mass. The supplementary mass is arranged so that after impingement of the armature it detaches from the armature and relieves the latter of a part of the spring force, so that a sufficiently high excess of force is available for braking the chatter movement. Again the movement conditions, ratios, are matched so that the movement of the armature and supplementary mass is counter-directional at the instant of the collision of the two bodies and the remaining kinetic energy is thereby dissipated to a large extent.

By the high reset spring force as the armature approaches the end of its pull-in movement, which may be as much as about 90% of the saturation induction force, extremely short reset delay times are achieved, which in comparison with the reset time are negligible also at small armature strokes. Because of the favorable form of the force gradient, in which high acceleration forces are available at the beginning of the reset movement, short reset times are obtained.

In the conventional prior art designs of electromagnetic injection valves for internal combustion engines, the residual air gap is in the order of magnitude of the working air gap. Because of the high reset spring force, according to the invention, the residual air gap of the magnetic circuit can be greatly reduced, in comparison to the conventional prior art designs, without this leading to an appreciable reset delay. Due to the reduced residual air gap, the leakage of the magnetic circuit is reduced and thereby the efficiency of the electric energy conversion at small armature strokes is greatly improved.

Although the most favorable dynamic properties are obtained with abruptly changing spring characteristics, their technical realization is difficult, in particular for very small armature strokes, as for instance in electromagnetic injection valves for internal combustion engines. Calculation and experiment have shown, however, that with very steep linear spring characteristics nearly equally good results can be obtained if a high excess of magnetic force is available already at the beginning of the pull-in movement. A rapid magnetic force buildup at the beginning of the armature movement can be achieved by rapid energization of the magnet coil. For very small spring paths helical springs are not suitable for producing the required steep spring force characteristics because of insufficient long-term stability. More suitable are cup springs, diaphragm springs or spiral springs. Cup springs, however, have only small contact areas, which are highly susceptible to wear. These disadvantages are avoided by diaphragm springs, which may take the form of a round flat plate. Suitable also are flat rotationally-symmetrical springs with radially arranged arms or other forms of spiral springs. Especially appropriate designs result when the mentioned suitable springs are used at the same time for the suspension or guiding of the armature or of the mechanism to be actuated. The movement conditions of the system with steeply ascending spring characteristic are matched in the same manner as in the systems with abruptly changing spring characteristic.

For the layout of the system the dimensioning of the mass and force conditions is uncritical within certain limits as long as provision is made that after impingement of the armature with the relief effect of the supplementary mass a high excess of force is available for braking the bounce movement. However, because the dynamic and geometric conditions differ greatly in the various magnet systems, no simple, generally valid dimensioning rules can be stated. Exact calculation is complicated, so that an experimental determination of the most favorable operating parameters usually gives the answer faster. In magnet systems with very small armature stroke, favorable conditions generally result if the increased spring force is 2 to 5 times, preferably about 3 times, the initial spring force. For abruptly changing spring characteristics the intensified spring force should be active over a path of 30–40% of the armature stroke. Further it is favorable if the spring force characteristic is horizontal in the intensified region or decreases toward the end of the pull-up movement. The required mass ratio depends to a large extent on the kinetic energy loss upon impingement of the individual masses. During the movement of the separate parts of the magnet system hydraulic forces are generally much lower than the other forces, although upon impingement of the separate parts, when the liquid is forced out of narrow gaps, they may assume quite considerable values. The rebound velocity of the moving parts, therefore, largely depends in liquid-swept systems on the geometry of the gaps between the moving parts and the other parts. The required mass ratio between armature and supplementary mass, after appropriate selection of the spring force characteristic at a given magnetic force characteristic, depends almost exclusively on the energy loss upon collision of the separate parts. Depending on the rest of the dimensions, in electromagnetic injection valves, according to the invention, the supplementary mass should usually be about 5–20% of the armature mass.

In the prior art literature it is occasionally affirmed that the magnetic force must always exceed the external static forces acting on the armature in order not to cause the movement to cease. This is not correct, as this approach does not take into account the kinetic energy of the armature. In the interest of a soft, low-bounce movement it may even be favorable if the reset spring force exceeds the magnetic force on a portion of the path. The only condition for a smooth movement is that the kinetic energy of the moving parts before the intersection of the spring characteristic with the magnetic force characteristic is higher than the work integral of the spring force exceeding the magnetic force. By the excess spring force the kinetic energy of the moving parts is reduced in the desired manner toward the end of the movement process. However, at the instant of armature impingement here, too, the magnetic force must exceed the spring force in order to suppress the always existing chatter and to cause the movement to cease.

Figure 6:
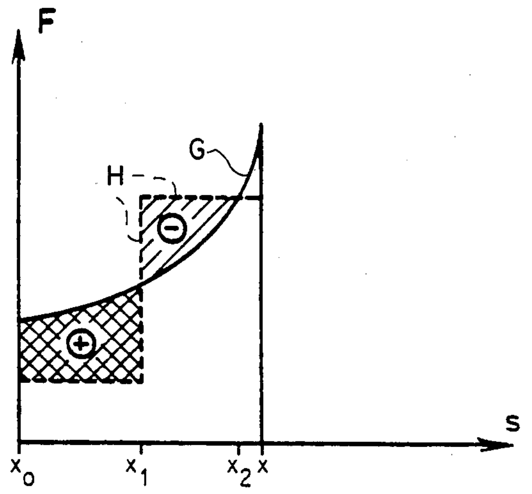
FIG. 6 is a graph illustrating the typical magnetic force characteristic of a magnet system, with the magnetic force plotted generally along the horizontal axis, employing a spring system which exhibits a sudden increase in force with such spring force being plotted generally along the vertical axis.
Figure 7:
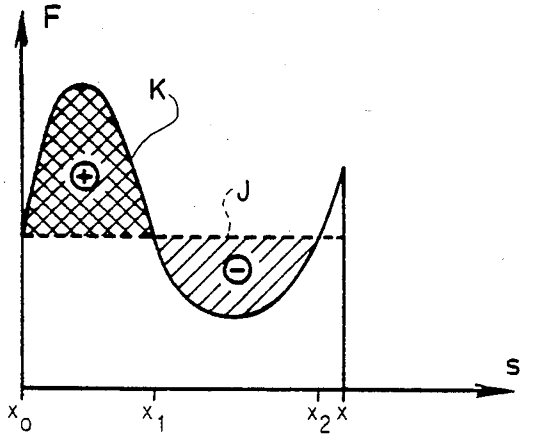
FIG. 7 is a graph similar to that of FIG. 6 but depicting the relationships occurring when there is an influence on the magnetic force characteristic even if the spring force gradient is constant.

To illustrate this, FIGS. 6 and 7 show two characteristics where the magnetic force characteristic intersects the spring characteristic to improve the dynamic behavior. FIG. 6 shows the typical magnetic force characteristic of a magnet system without influence on the characteristic, which is combined with a spring system whose characteristic had a sudden change. The magnetic force characteristic is shown as a solid line curve, G, while the spring force characteristic curve, H, is shown as a broken line. Up to point, $x_1$, the magnetic force exceeds the spring force, so that the armature is accelerated. At point, $x_1$, the kinetic energy of the armature corresponds to the integral of the cross-hatched area, which is marked by a plus sign. Upon continued movement the armature traverses a zone in which the spring force exceeds the magnetic force, so that the speed decreases again. The loss of kinetic energy corresponds to the integral of the hatched area (labeled with an encircled negative sign "−"). The condition for complete passage through the zone, in which the spring force exceeds the magnetic force, is merely that before entrance into the zone the kinetic energy of the armature is greater than the work integral of the static forces exceeding the magnetic force. In the graph of FIG. 6, therefore, the cross-hatched area (labeled with an encircled positive sign "+") must be larger than the hatched area (labeled "−"). To cause the movement to cease toward the end of the pull-in process it is further necessary, of course, that toward the end of the pull-in process the magnetic force exceeds the spring force and other static forces. By appropriate matching of the path and force ratios, extremely soft, low-bounce and rapid armature movements can be obtained, in particular in combination with the previously described supplementary mass system of the invention.

FIG. 7 shows the same relationships for a system with influence on the magnetic force characteristic. It illustrates that in special cases a strong influence on the dynamics is possible by intersection of the spring force characteristic J and magnetic force characteristic K even if the spring force gradient is constant.

The technical realization of the foregoing elucidations are hereinafter more fully described with reference to further embodiments employing teachings of the invention.

Figure 8:
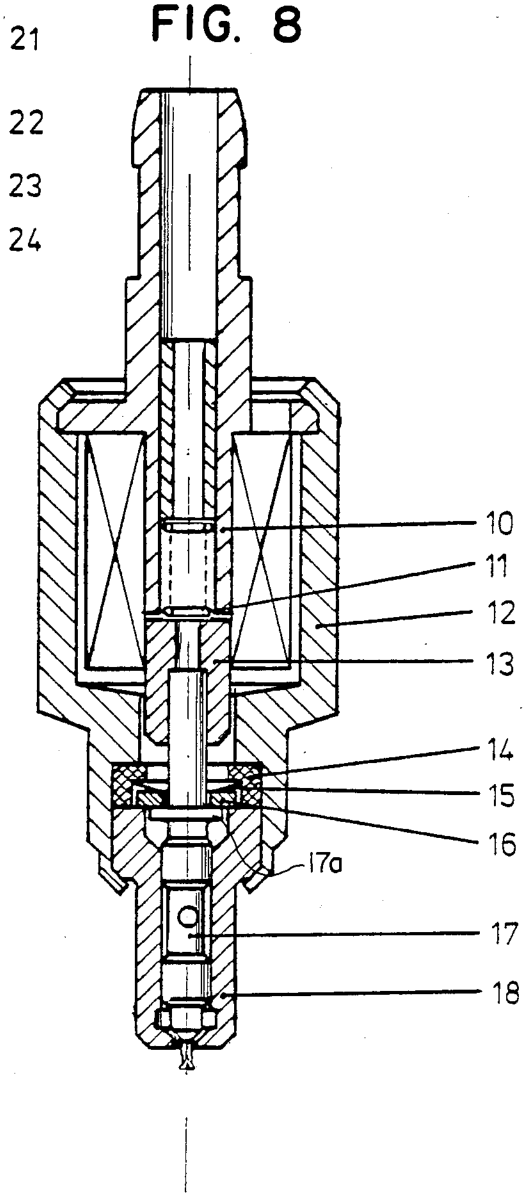
FIG. 8 is an axial cross-sectional view of an electromagnetic fuel injection valving assembly generally of prior art configuration but modified as to employ teachings of the invention.

FIG. 8 shows a fuel injection valve for internal combustion engines which with respect to the geometry of the magnetic circuit generally corresponds to the conventional prior art designs. However, unlike the conventional prior art designs, the valve assembly of FIG. 8 has two reset springs; that is, the helical spring 11 and the cup spring 15. The movable supplementary mass 16 is under the cup spring 15. The supplementary mass 16 rests on the valve body 18 so that, with the valve closed, a certain clearance remains between the strike plate 17*a* of the needle valve 17 and the supplementary mass 16.

Upon application of the energizing current the armature 13, and the needle valve 17 firmly connected with the armature, are pulled-in counter to the force of the helical spring 11. After a part of the armature path has been traveled, the strike plate 17*a* of the needle valve 17 impinges on the supplementary mass 16, whereby the spring force of the cup spring 15 is added to the spring force of the helical spring 11 is added to the spring. Toward the end of the pull-in movement the armature 13 strikes against the magnet pole 10 and bounces back. The supplementary mass 16, however, can continue its movement, counter to the force of the cup spring 15, thereby relieving the armature 13 and making available a high excess of magnetic force for the braking of the bounce movement of the armature 13.

Upon termination of the coil energizing current, the armature 13 is reset by the joint force of the two springs. By the improved dynamics the variations in the reproducibly injectable fuel quantity is reduced to a fraction of the usual prior art designs, whereby the metering accuracy is substantially improved especially in the critical idling range.

With the valve assembly illustrated in FIG. 8 it has been possible to achieve the following improvements of the dynamics as compared with the usual prior art design, with almost constant spring force gradient under equal electric drive conditions and at equal initial spring force. Because of the reduced residual air gap, with the valve assembly of FIG. 8, the same pull-in times were obtained despite the much greater spring forces and the following bounce time was shortened to about 30% of the value of the conventional prior art design. Further, the reset time was shortened by about 50%, with no appreciable reset delay occurring. Despite the short reset time of the valve assembly of FIG. 8, the bounce process after closing of the valve was also shortened about 50%, which was attributable to a considerable damping of the reset process by not yet decayed eddy currents in the magnet iron. With magnetic circuit forms low in eddy current, a still much greater reduction of the reset time can be achieved, depending on the electric damping of the coil.

Figure 9:
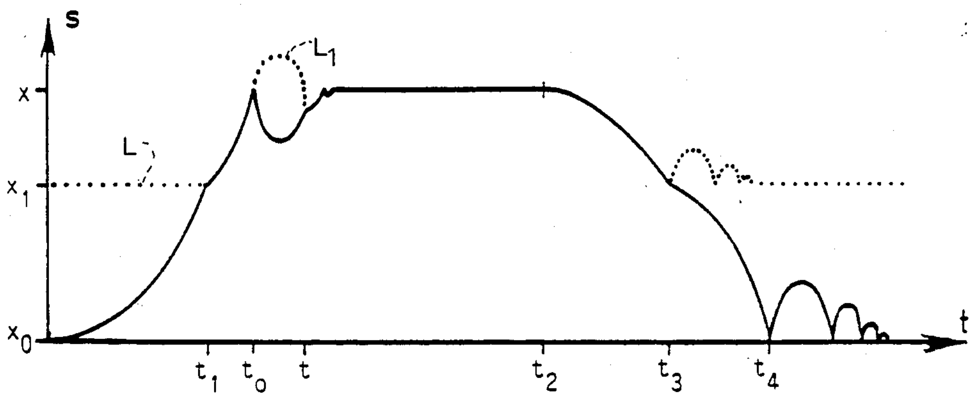
FIG. 9 is a graph illustrating the movement of the armature and of the supplementary mass, as generally depicted in FIG. 8, as a function of time.
Figure 10:
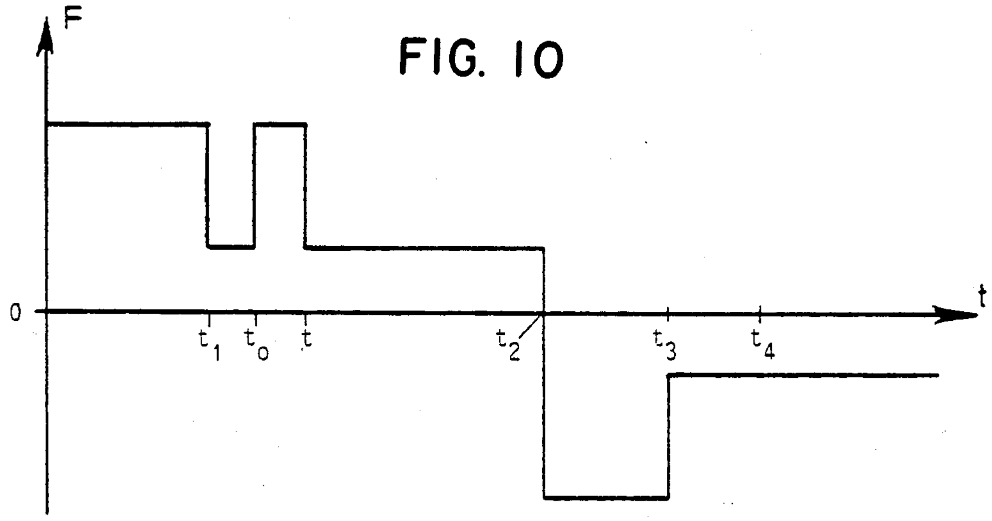
FIG. 10 is a graph illustrating the sum of the magnetic and spring forces acting on the armature as generally depicted in FIG. 8.
Figure 11:
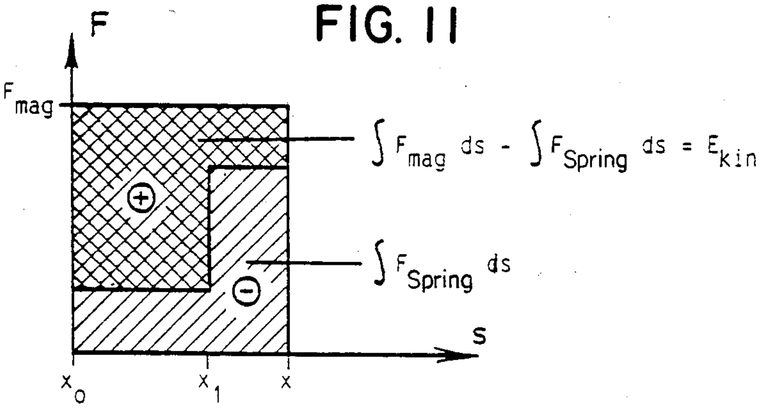
FIG. 11 is a graph illustrating the force gradient of spring and magnetic force as a function of the armature path as generally depicted in FIG. 8.

The dynamic conditions of the injection valve assembly according to FIG. 8 are illustrated in FIGS. 9, 10 and 11 on the simplifying assumption of constant spring and magnetic forces and neglecting the hydraulic forces. FIG. 9 shows the movement of the armature 13 and of the supplementary mass 16 (each of FIG. 8) as a function of time with the movement of the supplementary mass 16 being shown as a dotted line L and $L_1$. It can be seen that after impingement on the supplementary mass at time, $t_1$, the speed of the armature 13 increases less sharply, owing to which the impingement speed at time, $t_0$, is reduced. At time, $t_0$, the supplementary mass 16 detaches and relieves the armature of the force of the supplementary spring 15, so that a high excess of magnetic force is available for braking the rebounce movement. At time, t, the armature 13 and supplementary mass 16 collide in opposite directions, the kinetic energy of the two parts being converted to a large extent and the following chatter coming to a standstill quickly. At time, $t_2$, the energizing coil current is terminated. The then following reset movement begins almost without delay with great acceleration, because of the high reset spring force. At time, $t_3$, the supplementary mass 16 impinges on the valve body and relieves the armature. The armature 13 continues its path with diminished acceleration and reaches the end closing position at time, $t_4$. The following bounce movement is not stronger, despite the short reset times, than in conventional prior art systems, since because of the small total air gap and short reset delay considerable electrical energy is still stored in the magnet iron, which by joint action with eddy currents damps the reset process. Also, the bounce occurs always in the same reproducible manner so that the fuel metering accuracy is not impaired.

FIG. 10 shows the sum of the magnetic and spring forces acting on the armature. At the beginning of the movement the armature is accelerated by the magnetic force component, which exceeds the spring force of spring 11. At time, $t_1$, the force acting on the armature is reduced by the amount of the supplementary spring force of spring 15. The supplementary mass detaches at time, $t_0$, owing to which an increased force is available for braking the bounce movement. After the collision of armature and supplementary mass in opposite directions, the armature is pulled into the opening end position with diminished force. After termination of the coil energizing current at time $t_2$, the full force of the two spring 11 and 15 is available for resetting the armature. At time, $t_3$, the armature 13 is relieved of the force of the supplementary spring 15, whereby the armature 13 is pulled into the closing end position with diminished acceleration.

FIG. 11 shows the force gradient of spring and magnetic force as a function of the armature path of the embodiment of FIG. 8. The work integral available for armature acceleration during pull-in is here shown as a cross-hatched area (labeled with an encircled positive sign "+"), the work integral of the spring, which causes the armature reset, as a hatched area (labeled with an encircled negative sign "−"). It can be seen further that the force gradients during pull-in as well as during reset meet the requirements of short movement times, i.e. that at the beginning of the respective movement greatly increased acceleration forces are available. To illustrate the great number of possible designs according to the invention, two additional technical realizations will be shown lastly.

In the injection valve of FIG. 8, an abruptly changing spring characteristic was obtained by parallel connection of the two springs 11 and 15 and by stroke limitation (by element 14) of the supplementary spring 15. The abruptly changing spring characteristic can, however, be obtained also by a series connection.

Figure 12:
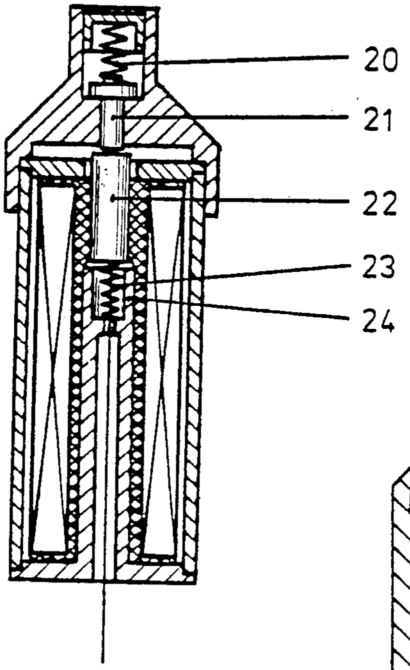
FIG. 12 is an axial cross-sectional view of an electromagnetic assembly, employing teachings of the invention, employed as a wire or line printer magnet assembly.

FIG. 12 shows a wire printer magnet, in which the drop-off movement of the armature is to take place with a minimum of bounce in order that the armature will come to rest quickly between the individual actuating cycles. For pull-in, on the contrary, the rebounce is desired so as to obtain a rapid reset movement and a neat graphic picture. The armature 22 of the printer magnet is brought into the inoperative position by the reset spring 23. On a part of the initial stroke, however, the force of the reset spring 23 is reduced by the supplementary spring 20. Accordingly, at the beginning of the pull-in movement a high excess of magnetic force is available for armature acceleration. After completion of the printing process, the armature is accelerated by the full force of the reset spring 23 and, after traveling a part of the reset path, impinges on the supplementary mass 21. The movement conditions are again matched so that the bounce of the armature is quickly caused to decay upon reaching the pull-in end position, in joint action with the supplementary mass 21. The armature and supplementary mass 21 may additionally be provided with a noise-damping plastic application, which, however, has barely any influence on the interaction of the two parts according to the invention.

Figure 13:
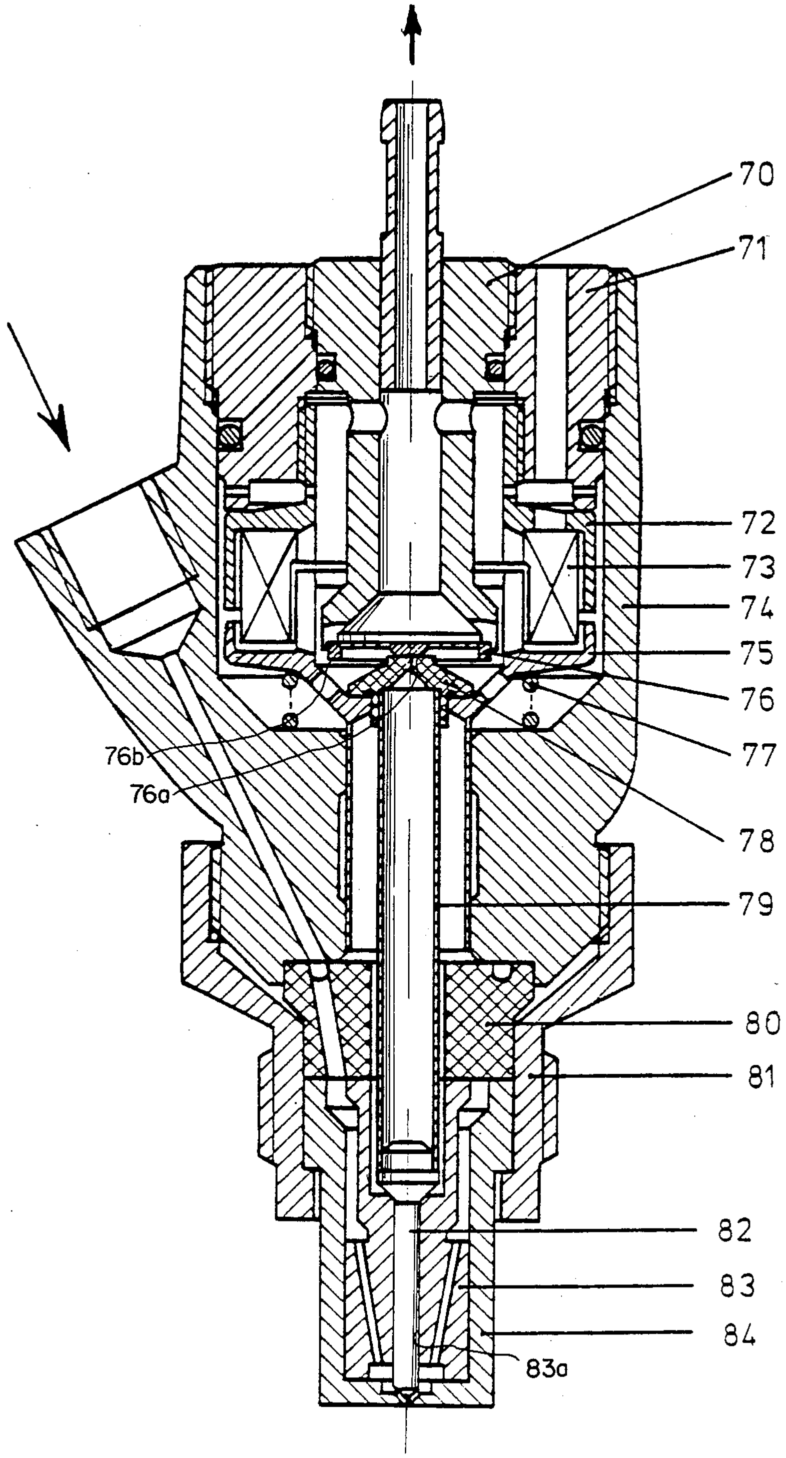
FIG. 13 is an axial cross-sectional view of an electromagnetic fuel injection valving assembly, employing teachings of the invention, as may be used for the injection of fuel into diesel engines.

FIG. 13 shows a high-pressure injection valve for fuel injection in diesel engines. Because of the high fuel pressure, there occur at the beginning of the needle valve movement high hydraulic forces, the compensation of which by the reset spring force is possible only in part. After completion of the injection process, bouncing of the needle valve must be stopped, to avoid harmful continued spraying of fuel resulting in undesired secondary injection.

By the helical spring 77, the armature 75 of the injection valve is caused to abut on the shoulder of the pressure or abutment piece 78. The pressure or abutment piece 78 is mounted for axial movement in the armature 75 with little radial clearance. The needle valve 82 is connected with the pressure or abutment via a connecting tube 79. The pressure or abutment piece 78, connecting tube 79 and needle valve 82 are acted upon by a diaphragm spring 76. The diaphragm spring 76 acting as a reset spring has a steep spring force characteristic, so that toward the end of the pull-in process the reset force acting on the armature is barely below the saturation induction force of the magnet system. This results in a very good adaption of the magnetic force characteristic to the hydraulic force requirement of the needle valve 82 and in a high excess of force at the beginning of the pull-in movement and reset movement.

After connection of the exciting current, the armature 75 starts to move counter to the force of the reset spring 76. During the pull-in movement, a pressure compensation takes place under the needle valve 82, bringing about an additional strong compressive force on the needle valve 82 in opening direction. The increasing compressive force onto the valve needle 82 is overcompensated by the increasing force of the reset spring 76, so that at the beginning of the pull-in movement a high excess of magnetic force is available for acceleration, which toward the end of the pull-in movement disappears almost completely. After reaching the opening end position, the armature 75 is relieved of the force of the reset spring 76, as has been shown before, so that the armature bounce quickly ceases. After termination of the coil energizing current, the full force of the reset spring 76 is again available, so that the armature moves back almost without delay with high acceleration. After the valve 82 has closed, the connection between armature 75 and needle valve 82 breaks because of the inertia of the armature 75. By the reset spring force 76, which is high in relation to the needle valve mass, the subsequent bounce of the needle valve 82 is effectively suppressed, thus preventing continued spraying. Thereafter the armature 75 is brought to a standstill by hydraulic damping forces and is made to abut on the shoulder of the pressure or abutment piece 78 by the weak force of the helical spring 77 at low speed, hydraulically damped.

Due to the spring characteristic well adapted to the dynamic and static requirements, the dimensions of the magnetic circuit can be greatly reduced. In fact, it is only through the high reset spring force that it is possible in the present application to obtain an acceptable reset delay at a small residual air gap.

To compensate differences between lots, calibration of the dynamic and hydraulic behavior by two adjusting screws has been provided. The spring force adjusting screw 70 changes the initial tension of the diaphragm spring while the support screw 71 changes the stroke of the armature and of the needle valve 82.

Through bores in the valve housing 74 and in the intermediate piece 80, the fuel, being under a pressure as constant as possible, is conducted to the seat of the needle valve 82. A small amount of fuel leakage gets through the gap between needle valve and needle valve guide 83 into the valve housing and is then returned to the fuel tank at low pressure. The moving parts of the injection valve are lubricated by the backflowing fuel.

Production of the valve needle guide bore 83*a* with small diameter at high precision is complicated. The valve can be simplified by making the housing pressure-proof and conducting the fuel under full system pressure directly into the housing, so that when the valve is open, the valve needle is relieved almost completely of unilaterally acting hydraulic forces. The diameter of the valve needle can then be increased without this leading to increased hydraulic interfering forces.

Another appropriate design is obtained by providing an injection valve with pressure-relieved armature space according to the embodiment of FIG. 13 with a valve needle of large diameter, the then occurring additional hydraulic forces being compensated by an additional helical spring. The helical spring is arranged above the diaphragm spring in such a way that the almost constant force of the helical spring is added to that of the diaphragm spring.

The diaphragm spring 76 is reinforced in the center 76*a* and on the outside 76*b*. By the reinforcements, located at the points of greatest mechanical stress, the load capacity of the diaphragm spring is substantially increased. The spring constant of the diaphragm spring 76 is dependent in greatest degree on the diaphragm thickness. The diaphragm spring is flat on one side, to adjust the spring constant by grinding the flat area down to equalize differences between lots. The spring constant depends also on the clamping conditions, however, so that its adjustment can be achieved also by cutting away or otherwise reducing the thickness of the reinforcements of the diaphragm spring.

It should now be evident that also in the case of injection valves which operate at low fuel pressures the dynamics can be improved by using reset springs with a steep spring characteristic. For injection valves where the armature and valve member are rigidly connected together an especially appropriate design results if the supplementary mass is firmly connected with a diaphragm spring and is made in one piece. Such a design can be employed, for example, for the injection valve according to FIG. 8, in that the spacer ring 14, the cup spring 15 and the supplementary mass 16 are replaced by a diaphragm spring as for example 76 of FIG. 13, with a central bore and a central tubular reinforcement of the weight of the supplementary mass. The spacer ring 14 would be replaced by the outer reinforcement of such a diaphragm spring. The helical spring 11 can then be dispensed with.

In injection valves which have, as armature and valve member, a flat plate, the diaphragm spring with supplementary mass can be placed around the armature like a collar. Another appropriate design results if the diaphragm spring acts on the armature of the magnet system via a central pressure stud or bolt which serves as a supplementary mass.

Although only preferred embodiments and selected modifications of the invention have been disclosed and described, it is apparent that other embodiments and modifications of the invention are possible within the scope of the appended claims.

What is claimed is:

1. In an electromagnet assembly for valves having an armature, electrical coil means, and armature return spring means, wherein said electrical coil means is effective upon energization to cause said armature to move in a first direction against the resistance of said return spring means toward a first end position of travel, wherein said armature tends to undergo a bouncing movement when said armature reaches said first end position of travel, wherein said return spring means is effective upon de-energization of said electrical coil means to cause said armature to move in a second direction opposite to said first direction and toward a second end position of travel, and wherein the distance traveled by said armature from said first end position of travel to said second end position of travel comprises the stroke of said armature, the improvement comprising at least one additional mass-means situated generally between said armature and said return spring means, said additional mass-means being movable in said first and second directions, wherein said additional mass-means serves as spring seat means for said return spring means, wherein said additional mass-means has a weight substantially less than that of said armature, wherein when said armature is at second end position of travel and said electrical coil means is energized the force of the resulting magnetic field causes both said armature and said additional mass-means to move in said direction toward said first end position of travel, wherein said additional mass-means is effective to continue to move in said first direction even after said armature has come to said first end position of travel to thereby at least substantially relieve armature of the effect of the force of said return spring means, wherein the length of time during which said additional mass-means at least substantially relieves said armature of the effect of the force of said return spring means in comparison to the inherent bouncing time of the armature while tending to undergo said bouncing movement is such as to enable the still existing excess force of said magnetic field to cause deceleration in said bouncing movement of said armature thereby minimizing the bouncing time of said armature.

2. An electromagnet assembly according to claim 1 wherein said return spring means comprises a single spring member.

3. An electromagnet assembly according to claim 1 and further comprising resiliently deflectable abutment means, said abutment means serving to cushion any impact as between said armature and said additional mass-means.

4. An electromagnet assembly according to claim 3 wherein said abutment means is carried by said armature.

5. An electromagnet assembly according to claim 1 wherein said armature is of generally cylindrical configuration, and wherein said armature is received generally within said electrical coil means for movement in said first and second directions.

6. An electromagnet assembly according to claim 1 wherein said armature is of cup-like configuration having a cylindrical wall and a transverse end wall, wherein said cylindrical wall circumscribes and embraces a portion of said electrical coil means, and wherein said additional mass-means operatively abuts against said transverse end wall.

7. An electromagnet assembly according to claim 1 wherein said armature is operatively connected to a valve for movement in unison with each other, wherein said second end position of travel is that position when said valve is closed, and further comprising first movable abutment means movable in unison with said armature and said valve when said armature is moving in said first direction, second stationary abutment means situated in the path of travel of said movable abutment means, and wherein said first end position of travel is that position of said armature when said movable abutment means operatively engages said stationary abutment means.

8. An electromagnet assembly according to claim 7 wherein said movable abutment means is operatively connected to said valve, and wherein said stationary abutment means is situated generally between said armature and said valve and between said armature and said movable abutment means.

9. An electromagnet assembly according to claim 1 wherein said return spring means comprises a diaphragm-type spring.

10. An electromagnet assembly according to claim 1 wherein said armature is operatively connected to a valve through lost-motion connecting means as to have said valve moved by said armature in said first direction, and wherein when said armature is moving in said second direction said lost-motion connecting means enables said valve to first become closed and further motion thereof in said second direction to be arrested while permitting the further movement of said armature in said second direction to said second end position of travel.

11. An electromagnet assembly according to claim 10 wherein said lost-motion connecting means comprises additional spring means, and wherein said additional spring means is effective after said armature reaches said second end position of travel and before said electrical coil means is energized to resiliently move said armature in said first direction a distance sufficient to eliminate any possible lost motion in said lost-motion connection and thereby cause a solid abutting connection as between said valve and said armature.

12. An electromagnet assembly according to claim 1 wherein the spring force characteristic of said return spring means is such as to result in a greatly increased rate of spring force being generated in said return spring means as said armature in its movement in said first direction approaches said first end position, wherein when said armature is at said first end position of travel the effective spring force of said return spring means is of a magnitude slightly less than the saturation induction force of said electromagnet, and wherein when said armature is at said second end position the effective spring force of said return spring means is of a magnitude less than half of said saturation induction force.

13. An electromagnet assembly according to claim 1 wherein said additional mass-means is comprised of associated valve means movable by said armature in said first direction.

14. In an electromagnet assembly for valves having an armature, electrical coil means, and armature return spring means, said return spring means comprising at least first and second spring members, wherein said electrical coil means is effective upon energization to cause said armature to move in a first direction against the resistance of said first spring member toward a first end position of travel, wherein said armature tends to undergo a bouncing movement when said armature reaches said first end position of travel, wherein said return spring means is effective upon de-energization of said electrical coil means to cause said armature to move in a second direction opposite to said first direction and toward a second end position of travel, and wherein the distance traveled by said armature from said first end position of travel to said second end position of travel comprises the stroke of said armature, the improvement comprising at least one additional mass-means movable in said first and second directions and operatively connected to said armature, wherein said second spring member is situated as to be between a stationary abutment and said additional mass-means, wherein said second spring member is also between said additional mass-means and said armature, wherein said additional mass-means has a weight substantially less than that of said armature, wherein when said armature is at said second end position of travel and said electrical coil means is energized the force of the resulting magnetic field causes both said armature and said additional mass-means to move in said first direction toward said first end position of travel, wherein said additional mass-means is effective to continue to move in said first direction even after said armature has come to said first end position of travel to thereby at least substantially relieve said armature of the effect of the force of said second spring member, wherein the length of time during which said additional mass-means at least substantially relieves said armature of the effect of the force of said second spring member in comparison to the inherent bouncing time of the armature while tending to undergo said bouncing movement is such as to enable the still existing excess force of said magnetic field to cause deceleration in said bouncing movement of said armature thereby minimizing the bouncing time of said armature.

15. An electromagnet assembly according to claim 14 wherein the spring force characteristic of said second return spring member in comparison to said first return spring member is very steep so that a greatly increased total spring force is generated in said return spring means as said armature in its movement in said first direction approaches said first end position of travel, wherein said greatly increased total spring force is of a magnitude slightly less than the saturation induction force of the electromagnet, and wherein when said armature is at said second end position of travel the effective total spring force of said return spring means is of a magnitude substantially less than half of said saturation induction force.

16. An electromagnet assembly according to claim 14 wherein said first spring member and said second spring member respectively have operating strokes of different lengths, and wherein a sudden-rise spring force characteristic of said return spring means is attained by having said first spring member and said second spring member operating in parallel relationship to each other so that said second spring member becomes effective for resiliently resisting the movement of said armature in said first direction only after said armature has traveled a substantial portion of its stroke away from said second end position of travel.

17. An electromagnet assembly according to claim 14 wherein the spring force characteristic of said return spring means includes a sudden rise so that a greatly increased spring force is generatred in said return spring means as said armature in its movement in said first direction approaches said first end position of travel and operatively engages said second spring member, wherein said greatly increased spring force is of a magnitude slightly less than the saturation induction force of the electromagnet, and wherein when said armature is at said second end position of travel said second spring member cease to exhibit any force against said armature and the spring force of said return spring means thereby becomes of a magnitude substantially less than half of said saturation induction force.

18. An electromagnet assembly according to claim 17 wherein said sudden rise in said spring characteristic occurs at a point which is from 40% to 90% of said armature stroke as measured from said second end position of travel.

19. An electromagnet assembly according to claim 17 wherein both prior and subsequent to the occurrence of said sudden rise said spring characteristic of said return spring means is linear and directly related to the distance moved by said armature.

* * * * *